(12) United States Patent
Wu et al.

(10) Patent No.: US 7,417,491 B2
(45) Date of Patent: Aug. 26, 2008

(54) CONSTANT CURRENT OUTPUT CHARGE PUMP

(75) Inventors: Jean-Shin Wu, Shindian (TW); Sorin L. Negru, San Jose, CA (US)

(73) Assignee: California Micro Devices Corp., Milpitas, CA (US)

( * ) Notice: Subject to any disclaimer, the term of this patent is extended or adjusted under 35 U.S.C. 154(b) by 69 days.

(21) Appl. No.: 11/643,831

(22) Filed: Dec. 22, 2006

(65) Prior Publication Data

US 2007/0170980 A1 Jul. 26, 2007

(30) Foreign Application Priority Data

Jan. 20, 2006 (TW) .............................. 95102181 A

(51) Int. Cl.
*G05F 1/10* (2006.01)
(52) U.S. Cl. ................... 327/536; 327/148; 327/157; 327/538

(58) Field of Classification Search ................. 327/536, 327/538–544; 307/110; 363/59, 60
See application file for complete search history.

(56) References Cited

U.S. PATENT DOCUMENTS 7,288,984 B2 * 10/2007 Armaroli et al. ............ 327/536

* cited by examiner

*Primary Examiner*—N. Drew Richards
*Assistant Examiner*—An T. Luu
(74) *Attorney, Agent, or Firm*—Bacon & Thomas, PLLC

(57) ABSTRACT

A constant current output charge pump includes a switch module configured to compare a reference voltage with a load voltage and output a switch signal, a voltage margin control module configured to compare a first voltage and a second voltage with an output voltage and output a voltage margin control signal, a clock control module, a charge pump module, a current control module and a load module. The clock control module is configured to capture the switch signal and the voltage margin control signal and output a first clock signal and a second clock signal according to a system to the charge pump module for charging the input voltage.

12 Claims, 4 Drawing Sheets

CONSTANT CURRENT OUTPUT CHARGE PUMP

BACKGROUND OF THE INVENTION

1. Field of the Invention

The present invention relates to a charge pump and, more particularly, to a constant current output charge pump suitable for a white light emitting diode (WLED).

2. Description of Related Art

Generally, portable electronic devices (e.g. PDAs or cellular phones) require to be provided with a constant voltage, and most devices are powered by batteries. Since the output voltage may decrease as the battery being consumed for a certain time, the output voltage cannot be kept at a stable level.

For example, batteries for common cellular phones can supply an output voltage of 3.0 to 4.5V; however, the WLED for cellular phones works at a voltage higher than 3.2V-3.4V. When a battery has been used for a certain time as the voltage drops under 3.4V, it disables the WLED of the cellular phone from functioning properly. At that point, despite the battery may still be partially charged, a charge pump, according to the conventional method, shall be employed to boost the voltage up to 3.4V and above, such that the WLED of the cellular phone can continue to function until the battery is completely exhausted. However, using a charge pump to increase the power voltage contributes to a fall in the output current, causing the power supply not able to be outputted at a constant level.

Therefore, it is desirable to come up with an improved charge pump with constant current output to overcome the above flaws.

SUMMARY OF THE INVENTION

The main objective of the present invention is to provide a constant current output charge pump, with which the rate of the power supply usage can be increased, while an output current can be provided at a constant level to the load module.

To achieve the above objective, the present invention relates to a constant current output charge pump, which includes a switch module configured to compare a reference voltage with a load voltage, and output a switch signal; a voltage margin control module configured to compare a first voltage and a second voltage with an output voltage, and output a voltage margin control signal; a clock control module configured to capture the switch signal by the switch module and the voltage margin control signal by the voltage margin control module and output a first clock signal and a second clock signal based on a system clock; a charge pump module configured to capture the first clock signal and the second clock signal outputted by the clock control module so as to boost an input voltage for outputting the output voltage; a current control module configured to capture the output voltage outputted by the charge pump module so as to adjust current for outputting the load current; and a load module having an anode which is electrically connected to the load voltage of the current control module, and a cathode which is electrically connected to a ground level.

Further, the present invention relates to a constant current output charge pump, which includes a switch module configured to compare a reference voltage with a load voltage, and output a switch signal; a voltage margin control module configured to compare a first voltage and a second voltage with an output voltage, and output a voltage margin control signal; a clock control module configured to capture the switch signal by the switch module and the voltage margin control signal by the voltage margin control module and output a first clock signal and a second clock signal based on a system clock; a charge pump module configured to capture the first clock signal and the second clock signal outputted by the clock control module so as to boost an input voltage for outputting the output voltage; a load module having an anode, which is electrically connected to the load voltage of the charge pump module, and a cathode for outputting the load voltage; and a current control module connected to the cathode of the load module to adjust current of the load voltage.

DETAILED DESCRIPTION OF THE PREFERRED EMBODIMENT

Figure 1:
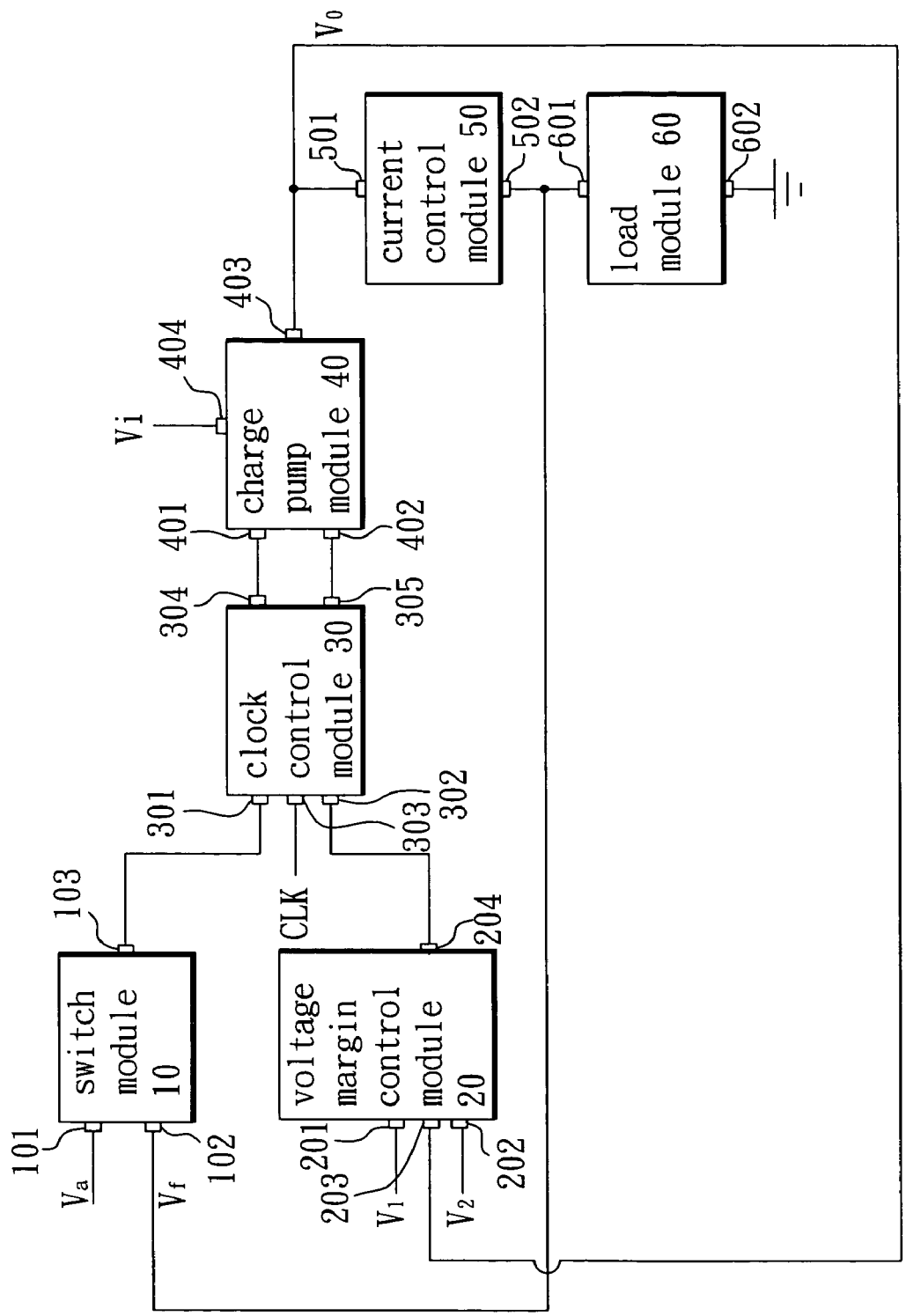
FIG. 1 is a system structure diagram of a preferred embodiment according to the present invention.

With reference to FIG. 1, there is shown a system structure diagram of the constant current output charge pump according to a preferred embodiment of the present invention. As shown in FIG. 1, the constant current output charge pump of the present invention comprises a switch module 10, a voltage margin control module 20, a clock module 30, a charge pump module 40, a current control module 50 and a load module 60.

The switch module 10 includes a reference voltage terminal 101, a feedback voltage terminal 102 and a switch signal output terminal 103. The switch module 10 inputs a reference voltage Va to the reference voltage terminal 101 and inputs a load voltage Vf to the feedback voltage terminal 102. Further, the switch signal output terminal 103 is configured to output a switch signal S1; when the reference voltage Va is greater than the load voltage Vf, the switch module 10 outputs the switch signal S1.

As shown in FIG. 1, the voltage margin control module 20 includes a first voltage terminal 201, a second voltage terminal 202, an output voltage terminal 203 and a control signal output terminal 204. The voltage margin control module 20 inputs a default first voltage V1 to the first voltage terminal 201, inputs a default second voltage V2 to the second voltage terminal 202 and receives an output voltage V0 at the output voltage terminal 203, wherein the first voltage V1 is higher than the second voltage V2. The voltage margin control module 20 outputs a voltage margin control signal S2 at the control signal output terminal 204 as the output voltage $V_O$ received is lower than the second voltage V2; when the output voltage V0 lies in between the first voltage V1 and the second voltage V2, the voltage margin control signal S2 is outputted continually at the control signal output terminal 204; and when the output voltage V0 is greater than the first voltage V1, outputting the voltage margin control signal S2 is terminated at the control signal output terminal 204.

The clock module 30 includes a first control terminal 301, which is configured to capture the switch signal S1 by the switch module 10, a second control terminal 302, which is configured to capture the voltage margin control signal S2 by the voltage margin control terminal 20, a clock input terminal 303 which is configured to receive a system clock CLK, a first clock output terminal 304 that outputs a first clock signal S3, and a second clock output terminal 305 that outputs a second clock signal S4. As the switch module 10 outputs the switch signal S1 at the switch signal output terminal 103 and the voltage margin control module 20 outputs the voltage margin control signal S2 at the control signal terminal 204, the first clock signal S3 and the second clock signal S4 outputted respectively from the first clock output terminal 304 and the second clock output terminal 305 are complementary effective clock triggering signals corresponding to the system clock CLK.

Figure 2:
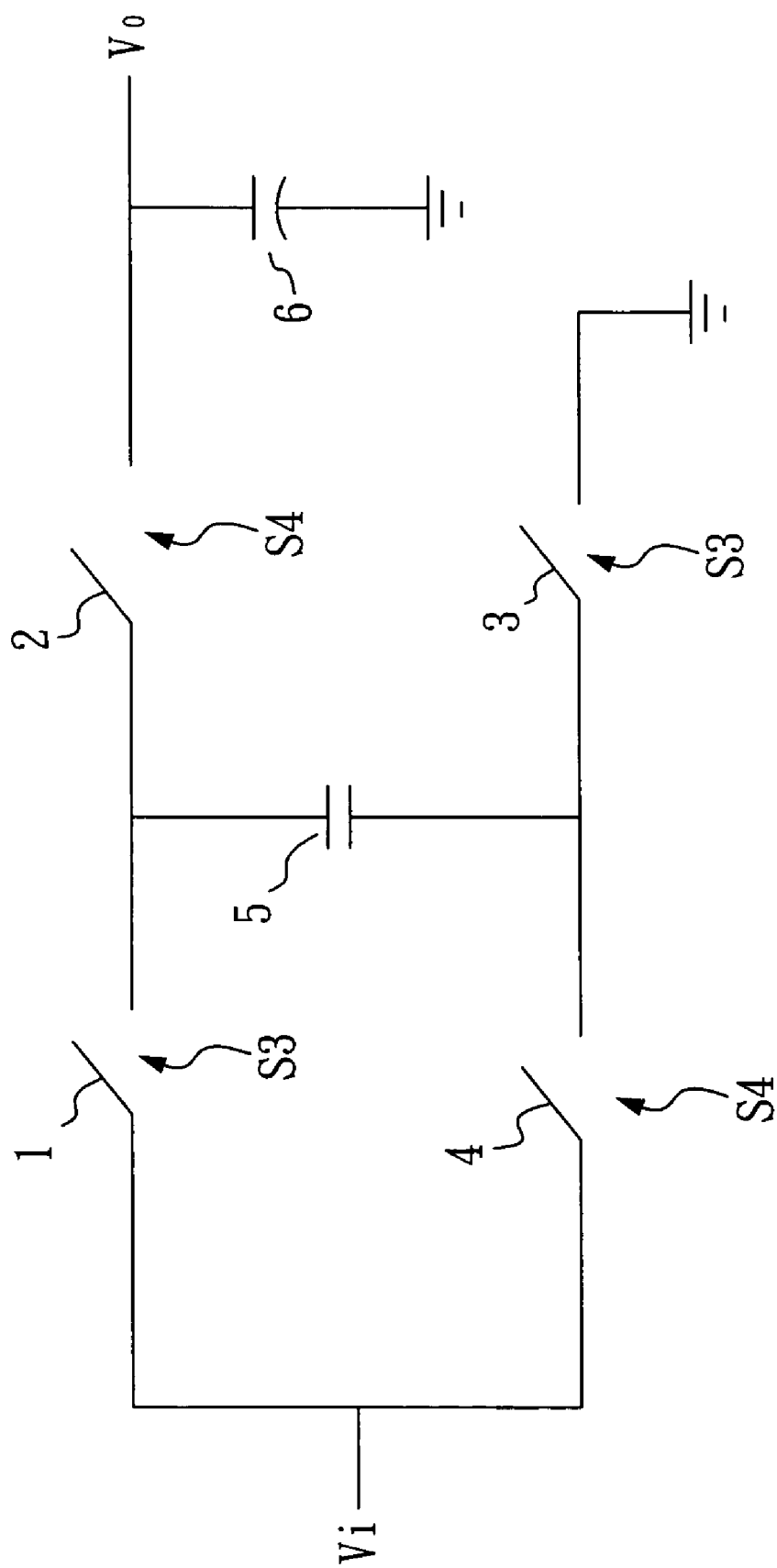
FIG. 2 is a schematic diagram of a charge pump module in the preferred embodiment according to the present invention.

The charge pump module 40 includes a first clock receiving terminal 401, which is configured to capture the first clock signal S3 outputted by the clock control module 30, a second clock receiving terminal 402, which is configured to capture the second clock terminal S4 outputted by the clock control module 30, a voltage input terminal 404, and a voltage output terminal 403. The charge pump module 40 boosts the input voltage Vi received at the voltage input terminal 404 and outputs an output voltage V0 via the voltage output terminal 403. The output voltage V0 is electrically fed back to the output voltage terminal 203 of the voltage margin control module 20. With reference to FIG. 2, the charge pump module 40 is composed of switch 1, 2, 3 and 4 and capacitor 5 and 6, in which switches 1 and 3 are a set of co-driven switches, and switches 2 and 4 are another set of co-driven switches. The switches 1 and 3 are controlled to be turned on or off by the first clock signal S3, whereas the switches 2 and 4 are controlled to be turned on or off by the second clock signal S4. Thus, when the switches 1 and 3 are turned on simultaneously while the switches 2 and 4 are simultaneously turned off, the capacitor 5 is charged to the input voltage Vi; after that, by turning off the switches 1 and 3 simultaneously while turning on the switches 2 and 4 simultaneously, the capacitor 6 can be instantaneously charged to the input voltage Vi, allowing the output voltage V0 to be outputted at twice the input voltage Vi to complete the charging process.

The current control module 50 can be a current regulator, which includes an input terminal 501, and an output terminal 502. The input terminal 501 is configured to capture the output voltage V0 outputted by the charge pump module 40 and output the load voltage Vf at the output terminal 502. The load voltage Vf is electrically fed back to the feedback voltage terminal 102 of the switch module 10.

As shown in FIG. 1, the load module includes an anode 601, which is electrically connected to a GND and a cathode 602, which is electrically connected to the load voltage Vf of the current control module 50.

Figure 3:
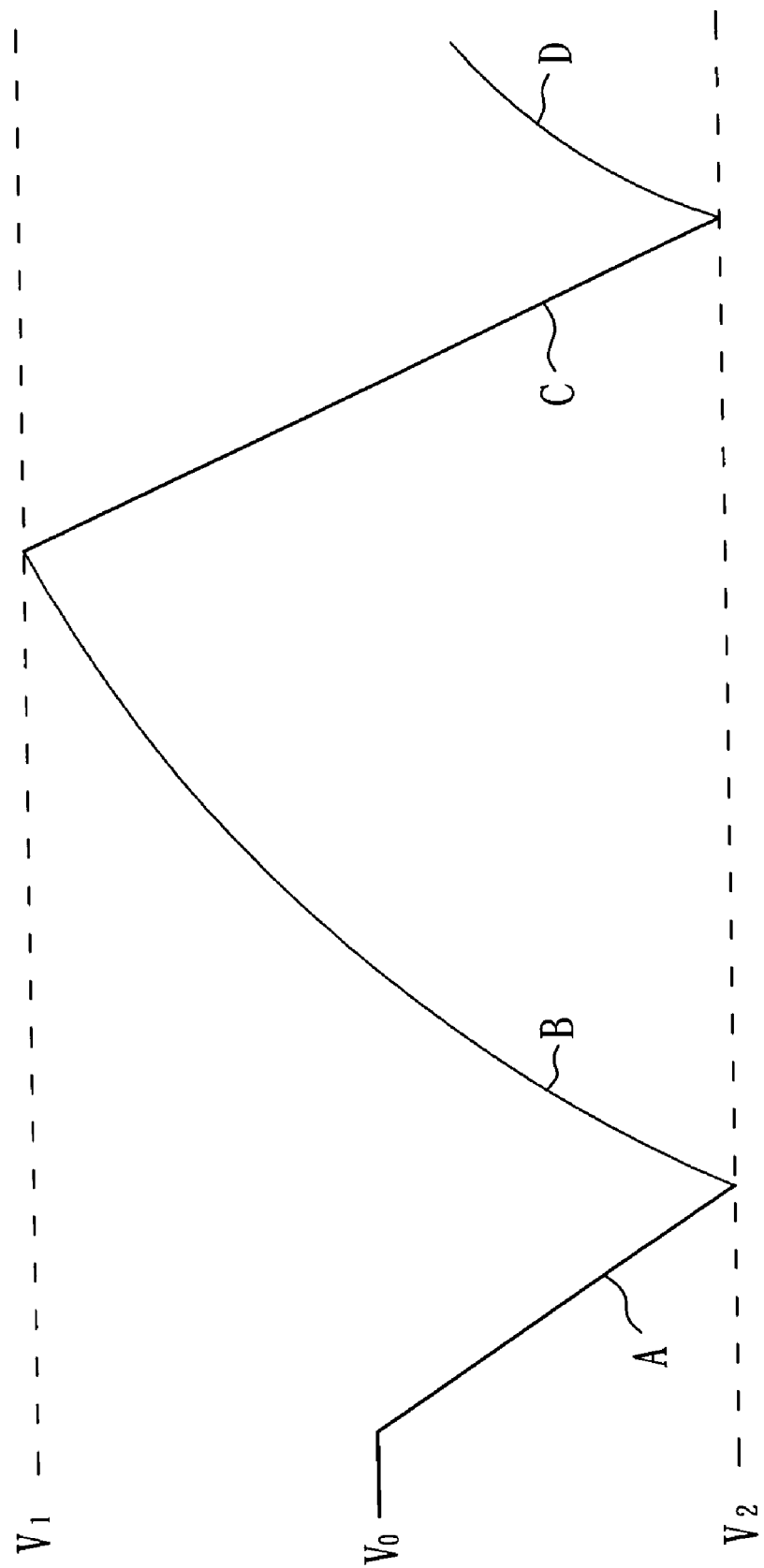
FIG. 3 is a waveform graph of the preferred embodiment according to the present invention.

FIG. 3 is the waveform graph of the present invention. With reference to FIGS. 1, 2 and 3, the first voltage V1 and the second voltage V2 of the voltage margin control module 20 can be used to control the voltage of the output voltage V0. For example, the first voltage V1 is set at 5V, and the second voltage V2 is set at 3V. When the output voltage V0 drops to 3V (as shown in segment A), the voltage margin control module 20 accordingly outputs the voltage margin control signal S2, while a switch signal S1 is outputted at the switch signal output terminal 103, to simultaneously trigger the clock control module 30. Then the charge pump module 40 begins charging the output voltage V0. Raising to a point where the output voltage V0 reaches 5V (as shown in segment B), the charge pump module 40 is then shut down, and by now the output voltage V0 is powered by the internal capacitor 6 (as shown in segment C). The charge pump module 40 will begin charging again as the internal capacitor 6 is discharging to 3V (as shown in segment D).

Therefore, the present invention can provide a constant current output charge pump that increases the rate of power usage and at the same time provide the load module (WLED) a constant output current.

Figure 4:
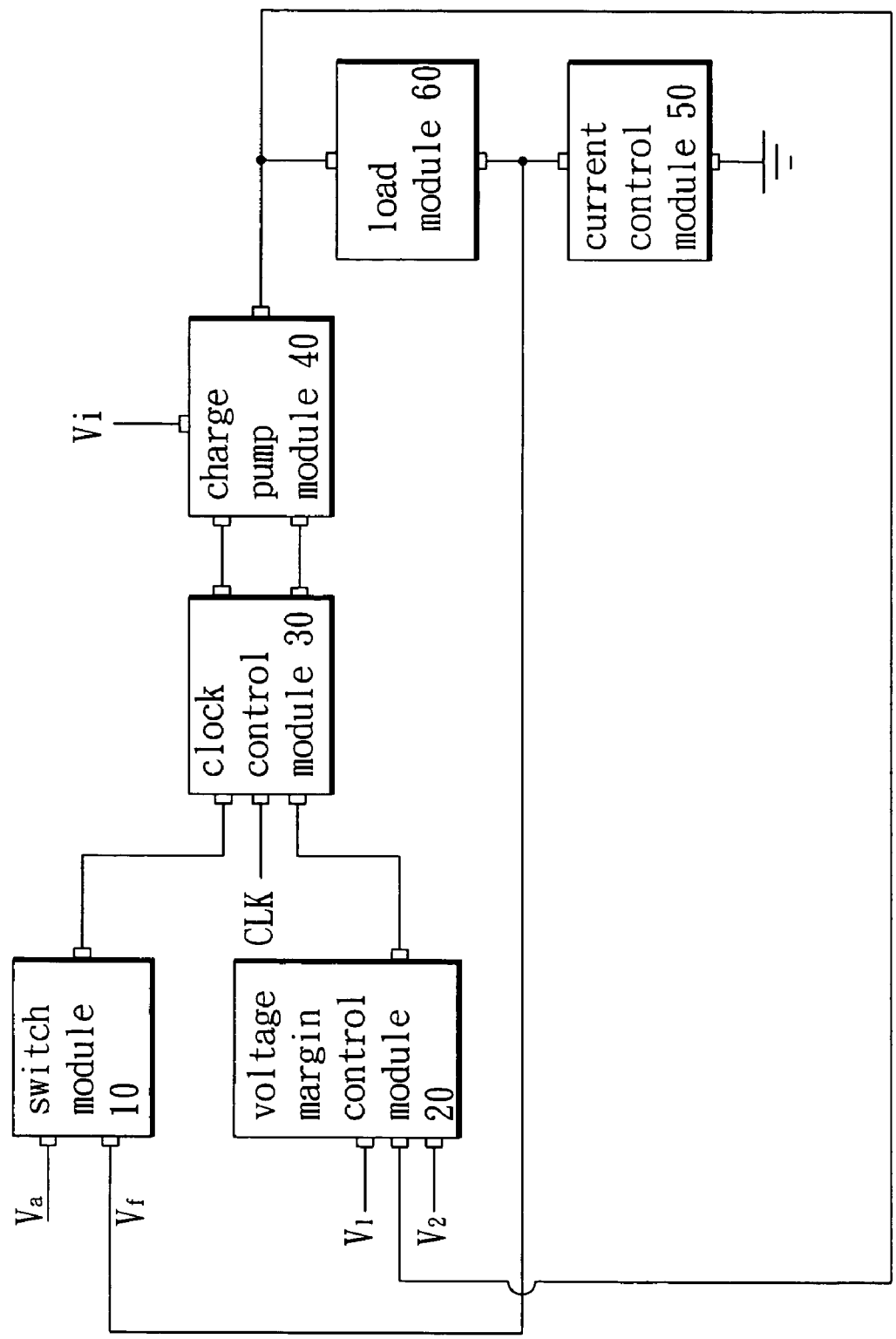
FIG. 4 is a system structure diagram of another preferred embodiment according to the present invention.

FIG. 4 shows a system structure diagram of the constant current output charge pump according to another preferred embodiment of the present invention. This embodiment is similar to the previous one except that the load module of this embodiment is a common-anode WLED. Thus the connection configuration of the current control module 50 and the load module 60 are different, wherein the anode of the load module 60 is electrically connected to the charge pump module 40, and the cathode outputs the load voltage Vf; whereas the current control module 50 is electrically connected to the cathode of the load module 60 to adjust the current of the load voltage Vf.

Although the present invention has been explained in relation to its preferred embodiment, it is to be understood that many other possible modifications and variations can be made without departing from the scope of the invention as hereinafter claimed.

What is claimed is:

1. A constant current output charge pump comprising:
    a switch module configured to compare a reference voltage with a load voltage, and output a switch signal;
    a voltage margin control module configured to compare a first voltage and a second voltage with an output voltage, and output a voltage margin control signal;
    a clock control module configured to capture the switch signal by the switch module and the voltage margin control signal by the voltage margin control module and output a first clock signal and a second clock signal based on a system clock;
    a charge pump module configured to capture the first clock signal and the second clock signal outputted by the clock control module so as to boost an input voltage for outputting the output voltage;
    a current control module configured to capture the output voltage outputted by the charge pump module so as to adjust current for outputting the load voltage; and
    a load module having an anode which is electrically connected to the load voltage of the current control module, and a cathode which is electrically connected to a ground level.

2. The constant current output charge pump as claimed in claim 1, wherein the switch module outputs the switch signal when the reference voltage is higher than the load voltage.

3. The constant current output charge pump as claimed in claim 1, wherein the voltage margin control module outputs the voltage margin control signal when the output voltage received is lower than the second voltage, continues to output the voltage margin control signal as the output voltage lies in between the first voltage and the second voltage, and terminates outputting the voltage margin control signal as the output voltage is higher than the first voltage, which is higher than the second voltage.

4. The constant current output charge pump as claimed in claim 3, wherein the clock control module outputs the first clock signal and the second clock signal as the switch module outputs the switch signal while the voltage margin control module outputs the voltage margin control signal, the first clock signal and the second clock signal being complementary clock signals corresponding to the system clock.

5. The constant current output charge pump as claimed in claim 4, wherein the charge pump module includes co-driven first and third switches and co-driven second and fourth switches, the first and third switches being controlled to be turned on or off by the first clock signal, the second and fourth switches being controlled to be turned on or off by the second clock signal, so that a first capacitor is charged to the input voltage as the first and third switches are turned on simultaneously while the second and fourth switches are simultaneously turned off, then by turning off the first and third switches simultaneously while turning on the second and fourth switches simultaneously, a second capacitor is also instantaneously charged to the input voltage, making the output voltage twice as much as the input voltage.

6. The constant current output charge pump as claimed in claim 5, wherein the current control module is a current regulator.

7. A constant current output charge pump comprising:
a switch module configured to compare a reference voltage with a load voltage, and output a switch signal;
a voltage margin control module configured to compare a first voltage and a second voltage with an output voltage, and output a voltage margin control signal;
a clock control module configured to capture the switch signal by the switch module and the voltage margin control signal by the voltage margin control module and output a first clock signal and a second clock signal based on a system clock;
a charge pump module configured to capture the first clock signal and the second clock signal outputted by the clock control module so as to boost an input voltage for outputting the output voltage;
a load module having an anode, which is electrically connected to the output voltage of the charge pump module, and a cathode for outputting the load voltage; and
a current control module connected to the cathode of the load module to adjust current of the load voltage.

8. The constant current output charge pump as claimed in claim 7, wherein the switch module outputs the switch signal when the reference voltage is higher than the load voltage.

9. The constant current output charge pump as claimed in claim 8, wherein the voltage margin control module outputs the voltage margin control signal when the output voltage received is lower than the second voltage, continues to output the voltage margin control signal as the output voltage lies in between the first voltage and the second voltage, and terminates outputting the voltage margin control signal as the output voltage is higher than the first voltage, which is higher than the second voltage.

10. The constant current output charge pump as claimed in claim 9, wherein the clock control module outputs the first clock signal and the second clock signal as the switch module outputs the switch signal while the voltage margin control module outputs the voltage margin control signal, the first clock signal and the second clock signal being complementary clock signals corresponding to the system clock.

11. The constant current output charge pump as claimed in claim 10, wherein the charge pump module includes co-driven first and third switches and co-driven second and fourth switches, the first and third switches being controlled to be turned on or off by the first clock signal, the second and fourth switches being controlled to be turned on or off by the second clock signal, so that a first capacitor is charged to the input voltage as the first and third switch are turned on simultaneously while the second and fourth switches are simultaneously turned off, then by turning off the first and third switches simultaneously while turning on the second and fourth switches simultaneously, a second capacitor is also instantaneously charged to the input voltage, making the output voltage twice as much as the input voltage.

12. The constant current output charge pump as claimed in claim 11, wherein the current control module is a current regulator.

* * * * *